United States Patent [19]
McIlhenny

[11] Patent Number: 4,689,133
[45] Date of Patent: Aug. 25, 1987

[54] DIRECTLY ELECTRICALLY COUPLED FUEL CELL-ELECTROLYSIS CELL SYSTEM

[75] Inventor: William F. McIlhenny, Lake Jackson, Tex.

[73] Assignee: The Dow Chemical Company, Midland, Mich.

[21] Appl. No.: 871,734

[22] Filed: Jun. 6, 1986

Related U.S. Application Data

[63] Continuation of Ser. No. 717,425, Mar. 29, 1985, abandoned.

[51] Int. Cl.⁴ .................. C25B 15/02; C25B 9/04
[52] U.S. Cl. .................................. 204/269; 204/98; 204/129; 204/DIG. 4
[58] Field of Search ............... 204/98, 128, 129, 269, 204/DIG. 4; 429/17, 18, 19, 51, 61

[56] References Cited

U.S. PATENT DOCUMENTS

| | | | |
|---|---|---|---|
| 3,124,520 | 3/1964 | Juda | 204/86 |
| 3,262,868 | 7/1966 | Juda | 204/98 |
| 3,459,953 | 8/1969 | Hughes et al. | 290/2 |
| 3,547,791 | 12/1970 | Mellish et al. | 204/98 |
| 3,755,128 | 8/1973 | Herwig | 204/230 |
| 3,905,884 | 9/1975 | Parenti, Jr. et al. | 204/129 |
| 4,235,693 | 11/1980 | Rowe et al. | 204/229 |
| 4,246,078 | 1/1981 | Broniewski | 204/98 |
| 4,276,145 | 6/1981 | Skala | 204/DIG. 4 |
| 4,284,899 | 8/1981 | Bendiks | 290/1 R |
| 4,502,928 | 3/1985 | Umetani | 204/98 |
| 4,534,833 | 8/1985 | Carr et al. | 204/128 |
| 4,647,351 | 3/1987 | Gelb | 204/98 |

Primary Examiner—John F. Niebling
Assistant Examiner—Terryence Chapman
Attorney, Agent, or Firm—J. H. Dickerson, Jr.; M. W. Barrow

[57] ABSTRACT

Direct D.C. electrical coupling between a fuel cell and an electrolysis cell is achieved without use of any other electrical power or storage source by use of an oxidant partial pressure control system. This system is based on comparison of the desired fuel cell output voltage with the actual voltage output of the fuel cell and adjusting the partial pressure accordingly.

5 Claims, 1 Drawing Figure

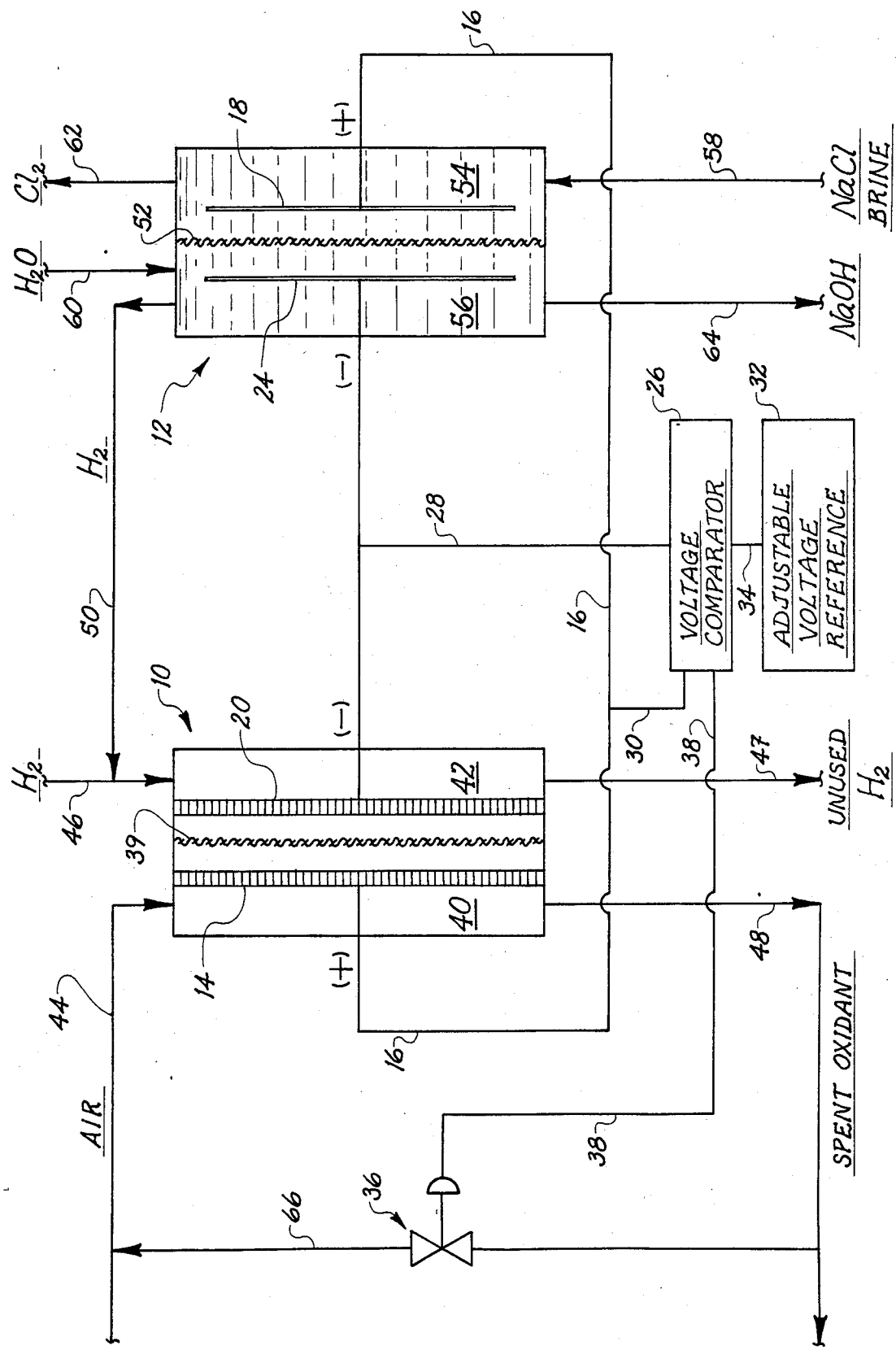

DIRECTLY ELECTRICALLY COUPLED FUEL CELL-ELECTROLYSIS CELL SYSTEM

This is a continuation of application Ser. No. 717,425, filed Mar. 29, 1985, now abandoned.

BACKGROUND OF THE INVENTION

Fuel cells produce direct electrical current and electrolysis cells ordinarily use direct electrical current. Therefore, it is desirable to direct and close couple electrically a fuel cell with an electrolysis cell to avoid the electrical losses associated with rectification as well as to avoid the electrical line losses associated with the usual conventional commercial electrical power utilization of fuel cells with electrolysis cells. This conventional utilization is accomplished by conversion of the fuel cell's electrical output from D.C. to A.C. current into a commercial power grid, transmission of some of the A.C. electrical current of the grid to the electrolysis cell site, and reconversion of this A.C. electrical current to D.C. electrical current at the electrolysis cell site for use by the electrolysis cell.

Many attempts have been made at direct coupling of fuel cell stacks to electrolysis cells. However, such direct coupling produces stability problems for the fuel cell's electrical output. This is brought about because the characteristics of the fuel cell cause it to produce less voltage at higher amperage outputs while the characteristics of the electrolysis cell require a higher voltage for a corresponding increase in current. Likewise the fuel cell produces a higher voltage if a lower current is demanded of it while an electrolysis cell needs a lower voltage for a lower current.

Consequently, a perturbation in the current in the electrolysis cell would ordinarily produce a runaway instability problem in the fuel cell's electrical output. For example, a sudden increase in the current passing through the electrolysis cell would require a sudden increase in the current output of the fuel cell. But these two like current changes call for opposite changes in the voltages of the electrolysis cell and the fuel cell. The fuel cell's voltage would ordinarily tend to decrease while the electrolysis cell's voltage would ordinarily tend to increase or at least stay the same. However, nature will not allow this to happen in the direct electrical current coupling desired between the fuel cell and the electrolysis cell. The present invention overcomes this stability problem.

SUMMARY OF THE INVENTION

The present invention is a fuel cell-electrolysis cell comprised of at least one fuel cell being D.C. electrically coupled to at least one electrolysis cell with no other electrical source supplying electricity to the electrolysis cell. That is to say, there can be more than one fuel cell in the system and there can be more than one electrolysis cell. Furthermore, those fuel cells can be connected together into stacks and groups of stacks, and these electrolysis cells can be connected together in stacks or groups of stacks as, for example, in a filter press arrangement. However, the fuel cells can be the only electrical supply source for the electrolysis cells in the invention.

For the above system to operate stably, it has been found that the system needs to have an electrical feedback means which utilizes the principle that the partial pressure of the oxidant is a control of the voltage of the electrical power output of the fuel cell.

This electrical feedback system is comprised of a voltage reference which ordinarily is adjustable, a means for changing the partial pressure of the oxidant in the oxidant stream flowing into the fuel cell, means for comparing the reference voltage with the actual voltage of the electricity produced by the fuel cell, and means for simultaneously controlling the oxidant partial pressure changing means in a direction which reduces toward zero any difference existing between the reference voltage and the fuel cell's electrical power output voltage.

BRIEF DESCRIPTION OF THE DRAWING

The drawing is a schematic view of the preferred embodiment of the invention.

DESCRIPTION OF THE PREFERRED EMBODIMENT

Referring to the drawing fuel cell 10 is seen to be directly coupled, electrically speaking, to electrolysis cell 12. The positive electrode 14 of fuel cell 10 is directly coupled by electrical power line 16 to the positive electrode 18 of electrolysis cell 12. The negative electrode 20 of fuel cell 10 is connected via electrical power line 22 to the negative electrode 24 of electrolysis cell 12.

The voltage of the electrical power output of fuel cell 10, and thus voltage input to the electrolysis cell 12, is sensed by voltage comparator 26. Voltage comparator 26 accomplishes this by being electrically connected to fuel cell positive power line 16 through electrical line 30 and by being electrically connected to fuel cell negative power line 22 through electrical line 28.

Voltage comparator 26 is connected to adjustable voltage reference 32 via electrical line 34.

Voltage comparator 26 compares the voltage of voltage reference 32 with the voltage of the electrical power output of fuel cell 10. If there is a difference between the fuel cell's voltage and the reference voltage, then voltage comparator 26 produces an electrical signal which is transmitted to power operated valve 36 via electrical line 38. This signal causes valve 36 to open more or close more. Which way valve 36 is made to change will be better understood, and therefore explained, after a discussion is given of the fluid flows of fuel cell 10 and electrolysis cell 12.

Fuel cell 10 is divided by separator 39 into a cathode compartment 40 and an anode compartment 42. Separator 39 allows ionic passage between electrode compartments 40 and 42. Electrodes 14 and 20 are porous so that there can be easily molecular transfer through them.

A stream containing an oxidant, for example air, is fed to the cathode compartment 40 of fuel cell 10 via gas line 44, and a stream containing fuel, for example hydrogen, is fed to its anode compartment 42 via gas line 46. As is well known, the oxygen gas molecules in the air undergo chemical reduction at the cathode 14, and the hydrogen gas molecules undergo chemical oxidation at the anode. The reduced hydrogen ion migrates through separator 39 to cathode compartment 40 where it combines with the reduced oxygen to form water. Unused hydrogen gas flows on through anode compartment 42 and exits from it via unused fuel line 47. The water formed from the combination of the oxygen and hydrogen ions in the cathode compartment 40 are flowed out of compartment 40 along with unused parts of the air feed into spent oxidant line 48.

The operation of the particular electrolysis cell shown is one in which sodium chloride brine is electrolyzed to form caustic, chlorine, and hydrogen. In this instance, all of the hydrogen generated is shown as being fed via line 50 into line 46 as supplemental hydrogen fuel for fuel cell 10. In one configuration, electrolysis cell 12 has an ion-exchange membrane 52 disposed between anode 18 and cathode 24. Thus membrane 52 divides electrolysis cell 12 into an anode compartment 54 and a cathode compartment 56. Sodium chloride brine is fed into anode compartment 54 via line 58, and make-up water is fed into cathode compartment 56 via line 60. Molecular chlorine exits cell 12 via fluid line 62 and aqueous sodium hydroxide exits cell 12 via fluid line 64.

Now to return to the control of valve 36 based on the voltage differences detected between reference voltage source 32 and the output electrical power voltage of fuel cell 10. As a method of controlling the output voltage of fuel cell 10, a diluent stream is added in varying controlled amounts to the oxidant-containing feed stream flowing in line 44. In this preferred embodiment, air is the oxidant-containing feed stream and the diluent is part of the spent oxidant coming out of fuel cell 10 via line 48. This spent oxidant is flowed in controlled varying amounts into oxidant feed line 44 by way of fluid flow line 66. Controllable valve 36 controls the amount of diluent flowed into air line 44 through line 66. As stated above, valve 36 is controlled by the electrical signal sent it via electrical line 38 from voltage comparator 26. If the diluent flow, or spent oxidant flow in this preferred embodiment, is increased in proportion to the oxygen being fed to the fuel cell's cathode compartment 40, then the partial pressure of the oxygen oxidant in this stream is necessarily decreased. And, as stated above, if this partial pressure is decreased then the voltage of the fuel cell's electrical output is decreased. The converse is also true; that is, if this diluent is decreased in proportion to the oxygen in the air being fed to the cathode compartment 40, then the partial pressure of the oxygen increases and so does the fuel cell's output voltage. Thus, a decrease in the diluent results in an increase in the partial pressure of the oxygen in the air stream, and this increase causes an increase in the voltage of the fuel cell's electrical power output.

Therefore, if voltage comparator 26 senses that the fuel cell's output voltage is below that of the reference voltage, then it signals valve 36 to close back until there is no such voltage difference. Conversely, if voltage comparator 26 senses that the fuel cell's output voltage is above that of the reference voltage, then it signals valve 36 to open until there is no such voltage difference.

This system has been described in terms wherein the electrolysis cell was a chlorine, caustic, and hydrogen producer. Other electrolysis cells are just as adaptable. For example, mere removal of membrane 52 turns the cell into a chlorate cell. Other electrolysis cells such as water electrolyzers and magnesium and aluminum cells are envisioned by this invention. In fact, any other type of electrochemical cell which uses electrical energy is envisioned as being capable of being driven by a close coupled fuel cell and is, therefore, included in this invention.

Having fully described and set forth the invention, accordingly what is claimed is:

1. A fuel cell-electrolysis cell system comprised of:
   (a) at least one fuel cell having an oxidant-containing stream feed line and fuel stream feed line, said fuel cell being D. C. electrically coupled directly to at least one electrolysis cell in such a fashion so that there is no other electrical source supplying electricity to the electrolysis cell and in such a fashion so that there are no means present for converting the fuel cell's electrical output from D. C. to A. C. to D. C. before it is utilized in the electrolysis cell;
   (b) a reference voltage means which produces a constant voltage and which means is adjustably presettable to the voltage at which it is desired for the fuel cell to produce its electricity;
   (c) means for monitoring the voltage of the actual electricity produced by the fuel cell with the preset voltage of the reference voltage means, and for producing a signal which is proportional to this voltage difference; and
   (d) means for receiving the signal which is proportional to the voltage difference and also for changing the partial pressure of the oxidant in the oxidant-containing stream flowed to the fuel cell in such a manner so that the difference between the voltage of the electricity actually produced by the fuel cell and the voltage of the voltage reference means tends toward zero in order that any voltage fluctuations which occur in the electrolysis cell will not cause instability in the voltage and electrical current output of the fuel cell.

2. The system of claim 1 wherein the means for changing the partial pressure of the oxidant in the oxidant-containing stream flowed to the fuel cell includes a means for cycling variable amounts of used oxidant stream reactants flowing out of the fuel cell into the oxidant stream flowed into the fuel cell.

3. The system of claim 1 wherein the electrolysis cell is a brine electrolysis cell which produces hydrogen gas, and wherein in this system at least part of the hydrogen gas from the electrolysis cell is fed as supplemental fuel into the fuel feed line of the fuel cell.

4. The system of claim 1 wherein the only fuel used by the fuel cell is hydrogen.

5. The system of claim 1 wherein the only oxidant-containing gas used by the fuel cell is air.

* * * * *